United States Patent [19]

Sakamoto et al.

[11] Patent Number: 5,229,775
[45] Date of Patent: Jul. 20, 1993

[54] DIGITAL PULSE COMPRESSION APPARATUS

[75] Inventors: Shoko Sakamoto; Haruo Akagi; Shoji Matsuda, all of Hyogo, Japan

[73] Assignee: Mitsubishi Denki Kabushiki Kaisha, Tokyo, Japan

[21] Appl. No.: 867,335

[22] Filed: Apr. 13, 1992

[30] Foreign Application Priority Data

Sep. 6, 1991 [JP] Japan ................... 3-255766

[51] Int. Cl.$^5$ .................. G01S 13/28; G01S 13/534
[52] U.S. Cl. .................. 342/160; 342/196; 342/201
[58] Field of Search .................. 342/160, 196, 201

[56] References Cited

U.S. PATENT DOCUMENTS 4,833,479 5/1989 Carlson .................. 342/194

FOREIGN PATENT DOCUMENTS 57-90179 6/1982 Japan .
57-182669 11/1982 Japan .

OTHER PUBLICATIONS

C. E. Cook et al., "Matched Filtering Pulse Compression and Waveform Design", Radars vol. 3, Pulse Compression, The Artech Radar Library, pp. 124–132, 1975.
E. C. Farnett et al., "Pulse Compression Radar", Radar Handbook, Second Ed., M. I. Skolnik, pp. 10.1–10.39, 1990.

Primary Examiner—T. H. Tubbesing
Attorney, Agent, or Firm—Rothwell, Figg, Ernst & Kurz

[57] ABSTRACT

A digital pulse compression apparatus comprises a plurality of doppler correction circuits for carrying out doppler correction in the time domain or the frequency domain and for carrying out pulse compression, and a maximum amplitude selecting means for selecting and outputting the maximum amplitude signal out of the compressed signals obtained from the doppler correction circuit at the rate of range bin period. The present invention can supply a pulse compression apparatus having a stable compression performance, even if a doppler frequency of the input signal is not known.

6 Claims, 8 Drawing Sheets

DIGITAL PULSE COMPRESSION APPARATUS

BACKGROUND OF THE INVENTION

The invention relates to a digital pulse compression apparatus used in the pulse compression radar.

A conventional digital pulse compression apparatus is disclosed, for example, in the book "Radar Handbook", M. Skolnik, 2nd edition, pp, 10.8. The circuit block diagram of such a conventional apparatus is shown in FIG. 7. In FIG. 7, 1 is a phase detector, 2 is a COHO (Coherent Oscillator) generator, 3 is an A/D converter, 4 is a Fast Fourier Transform (FFT) circuit, 5 is a complex multiplier, 6 is a compression filter coefficient memory, 7 is an Inverse Fast Fourier Transform (IFFT) circuit and 8 is an amplitude detector.

The operation of the conventional digital pulse compression apparatus is hereinafter described in FIG. 7. The received IF (Intermediate Frequency) signal of the radar is detected in the phase detector 1 using the reference signal from the COHO generator 2 and is changed to I and Q vector video analog signals. The I and Q vector video analog signals are converted to I and Q vector video digital signals by the A/D converter 3, and the converted digital signals are inputted to the FFT circuit 4. The I and Q vector video signals are generally referred to as expanded pulses in the pulse compression radar, and are comparatively long pulses, which are modulated so that the auto-correlation functions are like impulses. Therefore, after the signal is converted by the fourier transform to a frequency spectrum $X(\omega)$ in FFT circuit 4, the output frequency spectrum $X(\omega)$ is multiplied in the complex multiplier 5 by the complex conjugate $X^*(\omega)$ which is pre-stored in the compression filter coefficient memory 6. The resultant $X^*(\omega) \cdot X(\omega)$ is converted by inverse-fourier transform in the IFFT circuit 7 and returned to the time domain. At a result, a compression wave close to the impulse wave can be obtained. The amplitude information of the compression signal is obtained in the amplitude detector 8, and the amplitude information is used for the target detection. The contents of the above compression filter coefficient memory 6 may be substituted by $X^*(\omega) \cdot W(\omega)$ instead of the complex conjugate $X^*(\omega)$ of the expanded pulse, where $W(\omega)$ is a weighting function, in order to suppress the range side lobe.

The received signal of the radar is shifted by the doppler effect in response to the moving of the target. Assume a doppler frequency $\omega_d$, then the output of the FFT circuit 4 becomes $X(\omega+\omega_d)$. The doppler effects of the output $X(\omega+\omega_d)$ is generally well known as an ambiguity function which is disclosed, for example, in the book, David K. Barton, General Editor, "THE ARTECH RADAR LIBRARY", Raytheon Company, Vol III, Pulse Compression, pp. 124~132, C. E. Cook, M. Bernfeld and C. A. Palmieri, "Matched filtering, Pulse Compression and Waveform Design". That is, if the received signal includes the doppler frequency, the amplitude of the compression wave is decreased and the range side lobe is increased. The result badly influences the target detection, though the degree of influence is different depending upon the modulation type of the expanded pulse. If the pulse width of the expanded pulse is longer, the performance degradation becomes larger.

SUMMARY OF THE INVENTION

It is a primary object of the present invention to provide a digital pulse compression apparatus having a stable compression performance, even if the doppler frequency of the input signal is not known.

It is another object of the present invention to provide a digital pulse compression apparatus which can compress the pulse with simple circuitry.

It is further object of the present invention to provide a digital pulse compression apparatus wherein digital video signals having a large dynamic range can be compressed.

It is still a further object of the present invention to provide a digital pulse compression apparatus wherein a moving target having the same doppler frequency as that of the clutter can be detected.

In order to achieve the above objects, a digital pulse compression apparatus of the present invention comprises in one embodiment thereof a plurality of doppler correction circuits for carrying out the doppler correction in the time domain or the frequency domain and for carrying out the pulse compression, and a maximum amplitude selecting means for selecting the maximum amplitude signal out of the compressed signals received from said doppler correction circuit at the rate of range-bin period.

DETAILED DESCRIPTION OF THE PREFERRED EMBODIMENTS

Figure 1:
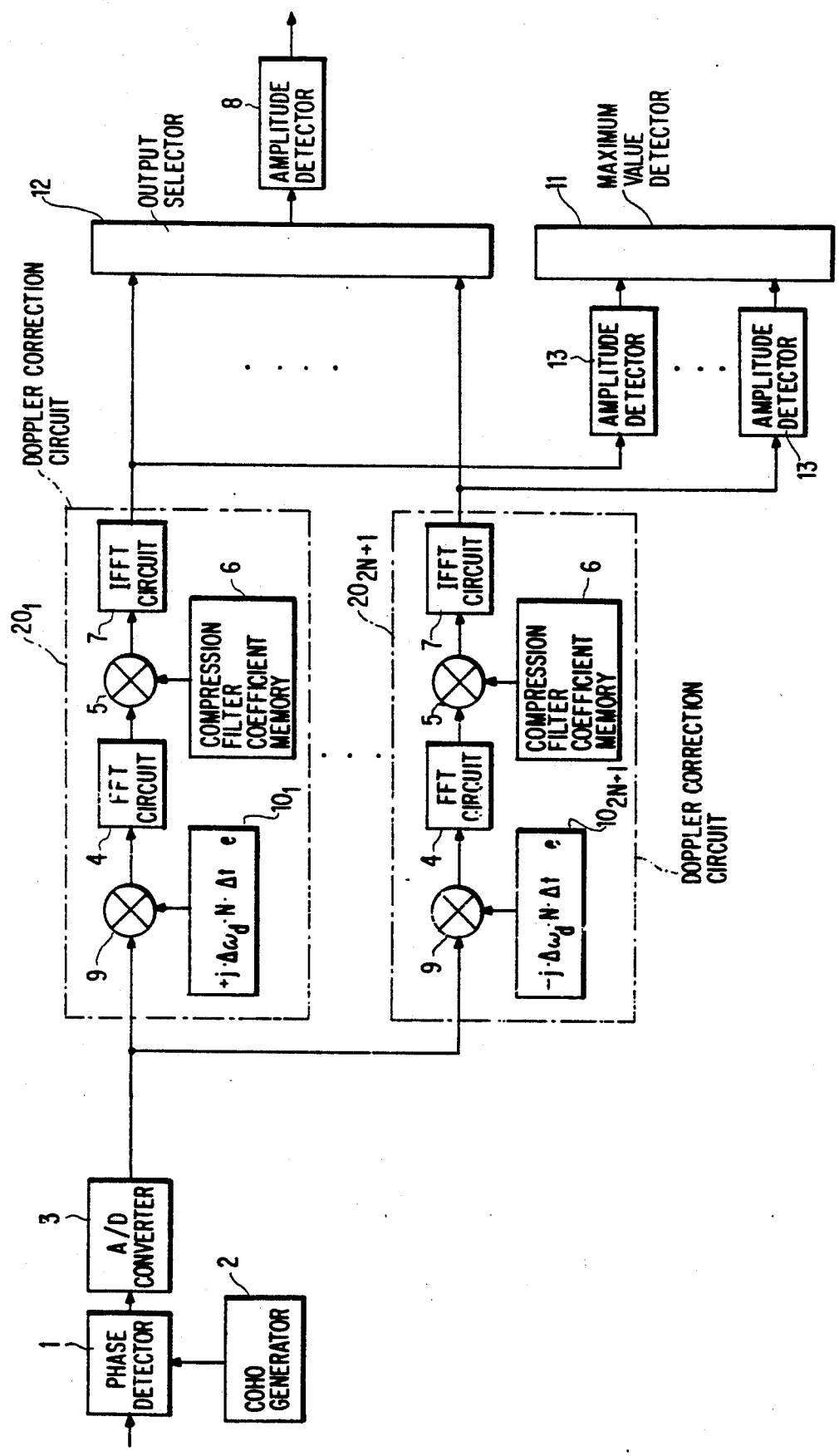
FIG. 1 is a block diagram of a digital pulse compression apparatus of a first embodiment of the present invention.

FIG. 1 is a block diagram of a digital pulse compression apparatus of a first embodiment of the present invention. In FIG. 1, the digital pulse compression apparatus carries out the doppler correction in the time domain. In FIG. 1, 1 is a phase detector, 2 is a COHO generator, 3 is an A/D converter, 4 are (2N+1) numbers of FFT circuits, 5 are (2N+1) numbers of complex multipliers, 6 are (2N+1) numbers of compression filter coefficient memories, 7 are (2N+1) numbers of IFFT circuits, 8 is an amplitude detector and 9 are (2N+1) numbers of complex multipliers for doppler correction. Designated by numerals $10_1 \sim 10_{(2N+1)}$ are doppler correction amount generators of $\exp(-j \cdot \Delta\omega_d \cdot i \cdot \Delta t)$, where $\Delta\omega_d$ is the fineness of the doppler correction, i is the number of $-N \sim +N$ and $\Delta t$ is the time quantize unit of A/D conversion. Designated by numerals $20_1 \sim 20_{(2N+1)}$ are doppler correction circuits for carrying out the doppler correction in the time domain and the pulse compression, each of which comprises a complex multiplier 9, a doppler correction amount generator $10_1 \sim 10_{(2N+1)}$, FFT circuit 4, complex multiplier 5, compression filter coefficient memory 6 and IFFT circuit 7. Numeral 11 designates a maximum value detector, 12 is an output selector and 13 is an amplitude detector.

The operation of the digital pulse compression apparatus of the first embodiment of the present invention is hereinafter described using FIG. 1. The process for converting the received IF signal to digital I and Q video signals using the phase detector 1, the COHO generator 2 and the A/D converter 3 is the same as the process of the conventional prior art. The output of the A/D converter 3 is branched and inputted to the $(2N+1)$ numbers of complex multipliers 9, wherein each correction amount for doppler correction is shifted by $\Delta \omega_d$ using the doppler correction amount generator 10.

That is, the amounts of $\exp(-j \cdot \Delta \omega_d \cdot i \cdot \Delta t)$, where $i = -N \sim +N$, are generated in each doppler correction amount generator 10, and each amount is multiplied by the input signal in the complex multipliers 9.

Let T be a pulse width of the expanded pulse, then $\Delta \omega_d$ is generally selected in accordance with the following equation in order to decrease the gap between the adjacent channel.

$$\Delta \omega_d \omega (0.5-1.0) 2\pi /T$$

N is also selected so that $N \cdot \Delta \omega_d$ becomes the maximum doppler frequency anticipated from the target movement.

According to the above selection, one of the $(2N+1)$ numbers of complex multipliers 9 outputs a corrected signal. Each output of complex multipliers 9 is then compressed by the FFT circuit 4, complex multiplier 5, compression filter coefficient memory 6 and IFFT circuit 7 in the same method as the conventional art. Each amplitude of the $(2N+1)$ numbers of compressed outputs is detected by the amplitude detector 13 respectively. The signal having maximum amplitude is detected by the maximum value detector 11 for a range bin period. The selector 12 selects the signal having a maximum amplitude according to the information from the maximum value detector 11 and outputs it to the amplitude detector 8. The amplitude detector 8 detects the amplitude of the compressed signal outputted through the selector 12. The amplitude information is used for the target detection.

As described above, in the first embodiment of the present invention, the doppler component of the input signal is corrected in the time domain by a plurality of the doppler correction circuits having different correction amounts, then the corrected pulse is compressed. Then the selected maximum amplitude signal is outputted to the amplitude detector 8. Therefore, even if a doppler frequency of the input signal is not known, a pulse compression apparatus having a stable compression performance can be supplied by the present invention.

Figure 2:
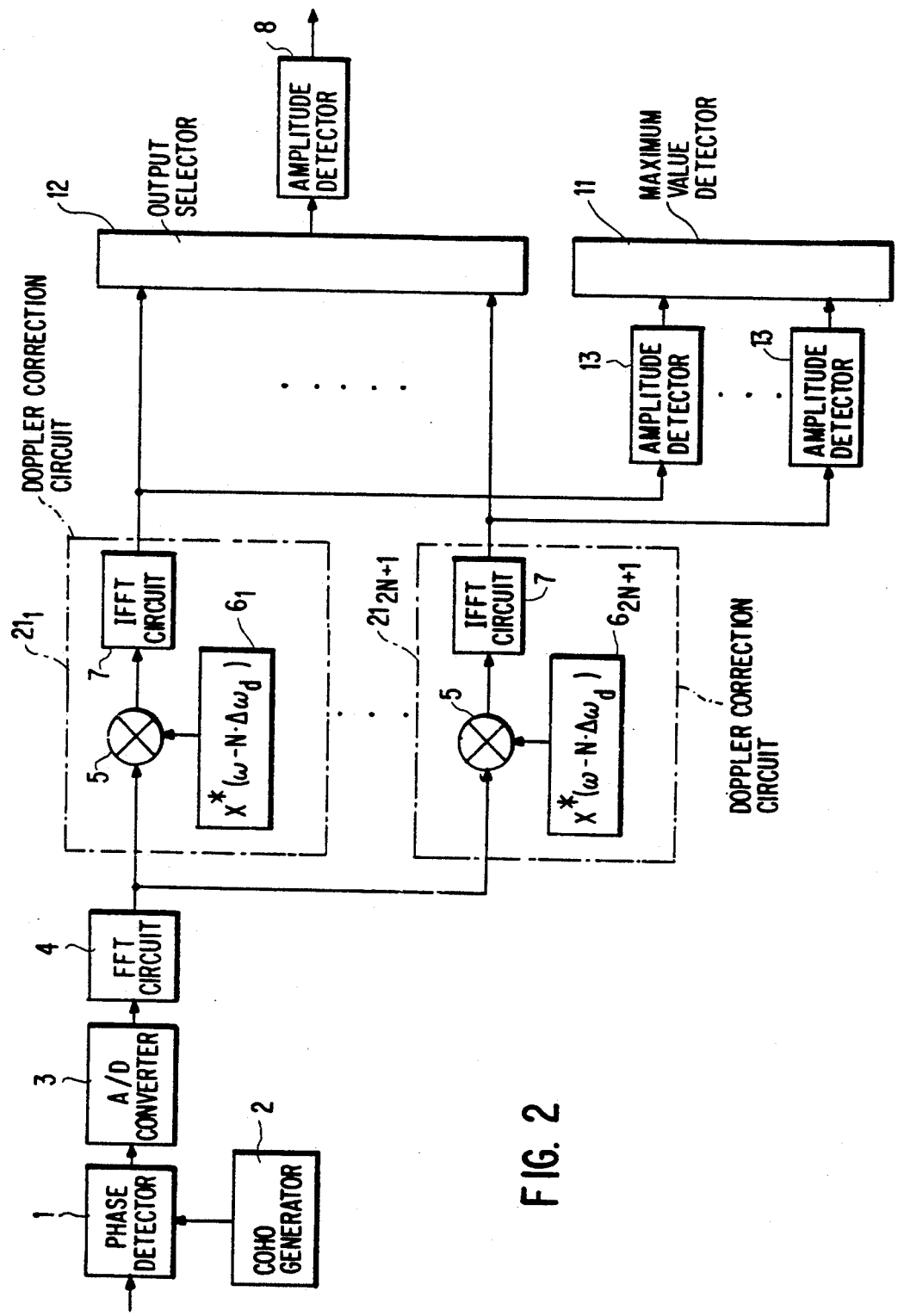
FIG. 2 is a block diagram of a digital pulse compression apparatus of a second embodiment of the present invention.

FIG. 2 shows a block diagram of a digital pulse compression apparatus of a second embodiment of the present invention. The second digital pulse compression apparatus differs from the first embodiment of FIG. 1 in that $(2N+1)$ numbers of doppler correction circuits are arranged in parallel at the output port of the FFT circuit 4 for carrying out the doppler correction in the frequency domain, respectively. In FIG. 2, 1 is a phase detector, 2 is a COHO generator, 3 is an A/D converter, 4 is a FFT circuit, 5 are $(2N+1)$ numbers of complex multipliers, $6_1 \sim 6_{(2N+1)}$ are compression filter coefficient memories and 7 are $(2N+1)$ numbers of IFFT circuits. Numerals $21_1 \sim 21_{(2N+1)}$ designate doppler correction circuits for doppler correction and pulse compression, which comprises the complex multipliers 5, the compression filter coefficient memories $6_1 \sim 6_{(2N+1)}$ and the IFFT circuits 7. 8 is an amplitude detector, 11 is a maximum value detector, 12 is an output selector and 13 is amplitude detector.

The operation of the digital pulse compression apparatus of the second embodiment of the present invention is hereinafter described using FIG. 2. The process for converting the received IF signal to the digital I and Q video signals through the phase detector 1, the COHO generator 2 and the A/D converter 3 and for converting the digital I and Q video signals to the frequency spectrum respectively through the FFT circuit 4, is the same as the process of the conventional prior art. The output of the FFT circuit 4 is branched and inputted to the $(2N+1)$ numbers of complex multipliers 5. The inputs are multiplied respectively by the pulse compression filter coefficient $X^* (\omega + \Delta \omega_d \cdot i)$, where $i = -N \sim +N$, which is generated in the compression filter coefficient memories $6_1 \sim 6_{(2N+1)}$ and shifted by $\Delta \omega_d$. Or the inputs are multiplied respectively by the pulse compression filter coefficient $X^* (\omega + \Delta \omega_d \cdot i) \cdot W(\omega + \Delta \omega_d \cdot i)$, where $W(\omega)$ is a weighing function, for suppressing the range sidelobe. The output signals of the doppler correction circuits 21 are selected and outputted to the amplitude detector 8 through the selector 12 in the same method as the first embodiment.

In the second embodiment of the present invention, since the doppler correction is carried out in the frequency domain, the doppler correction and the pulse compression are carried out at the same time. Accordingly, in the second embodiment, the doppler correction amount generator 10, complex multipliers 9 and the FFT circuit 4 which are supplied for each doppler correction circuit 20 can be omitted. Therefore, the circuit of the second embodiment can carry out the pulse compression with simple circuitry.

Figure 3:
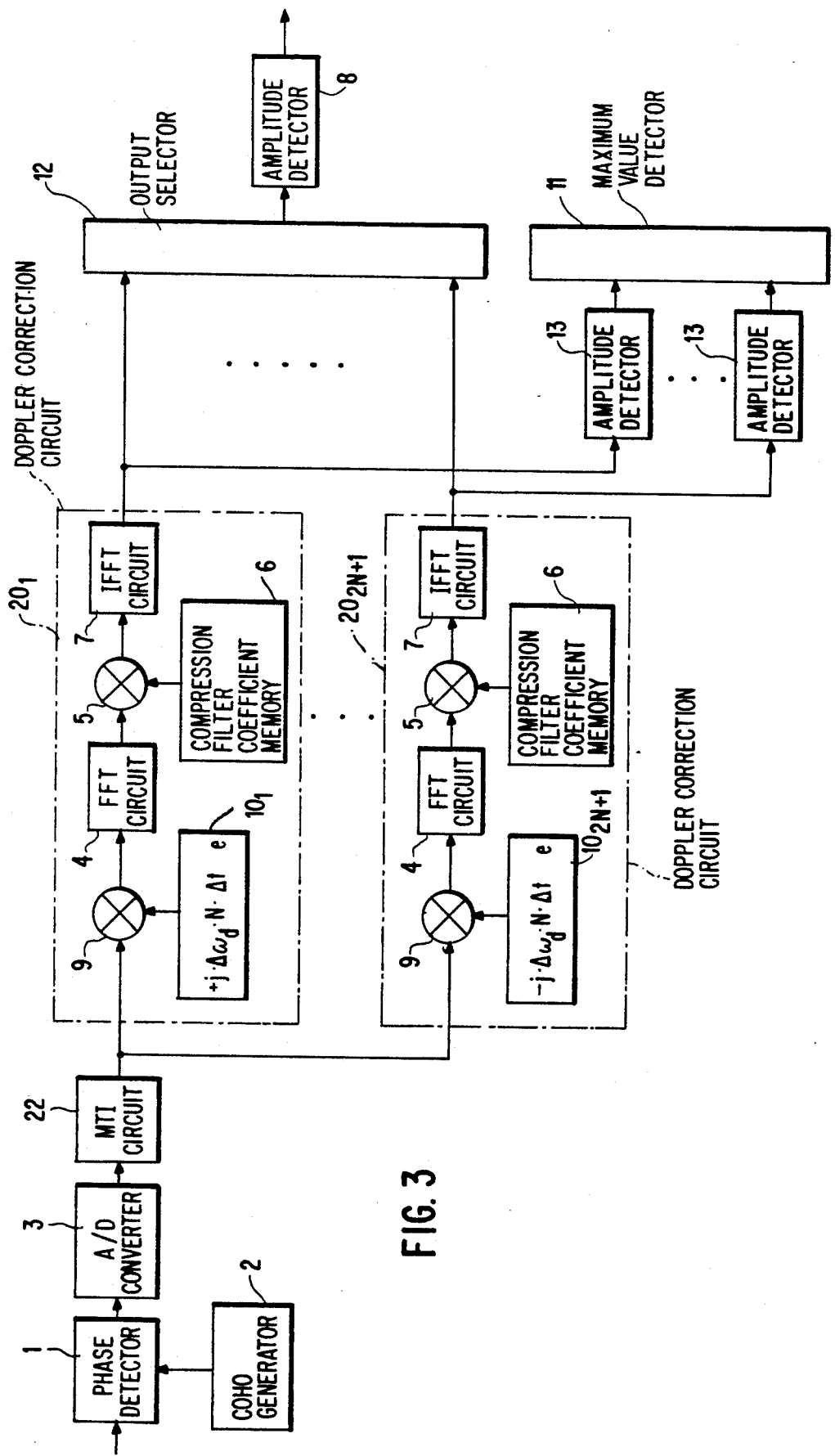
FIG. 3 is a block diagram of a digital pulse compression apparatus of a third embodiment of the present invention.
Figure 4:
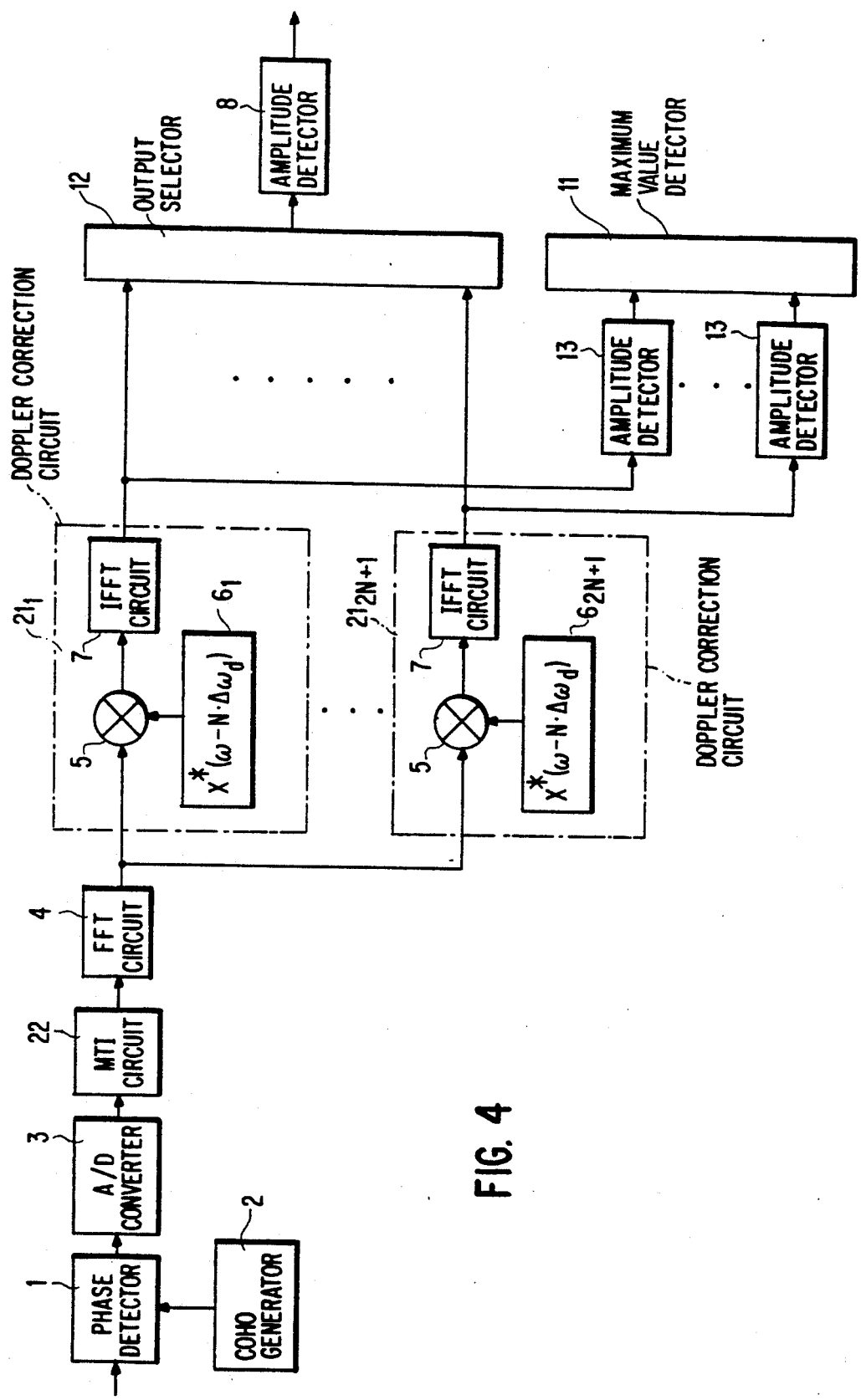
FIG. 4 is a block diagram of a digital pulse compression apparatus of a fourth embodiment of the present invention.

FIG. 3 and FIG. 4 show block diagrams of the digital pulse compression apparatus of a third and a fourth embodiments of the present invention. The third and fourth digital pulse compression apparatus differ from the first and second embodiments of FIG. 1 and FIG. 2 in that the MTI (Moving Target Indication) circuit or a well known pulse doppler circuit is arranged at the output port of the A/D converter 3.

In the prior art regarding this kind of apparatus, an attenuator is generally arranged at the input port of the A/D converter 3 for attenuating the input signal so that the input signal does not exceed the maximum input level for the pulse compression circuit. This is because the maximum bit numbers are defined at the output port of the pulse compressing circuit. Since the large level clutter is also attenuated in the attenuation circuit of the prior art, there has been a major problem that the signal level of the target lower than the clutter level becomes smaller.

In FIG. 3 and FIG. 4, 22 is a well known MTI circuit which is arranged at the output port of the A/D converter 3 for eliminating the ground clutter having a large amplitude. Other elements of the apparatus are the same as those of the elements of FIG. 1 and FIG. 2.

In the third and fourth embodiments of the invention, since the large level target signal can be inputted, the quantized error through the pulse compression process is decreased. Accordingly, the third and fourth embodiments of the present invention have an effect in that the digital I and Q video signals having a large dynamic range can be compressed since the clutter is eliminated, as well as the substantial effect which is obtained by compressing the pulse in correspondence with an unknown doppler frequency.

Figure 5:
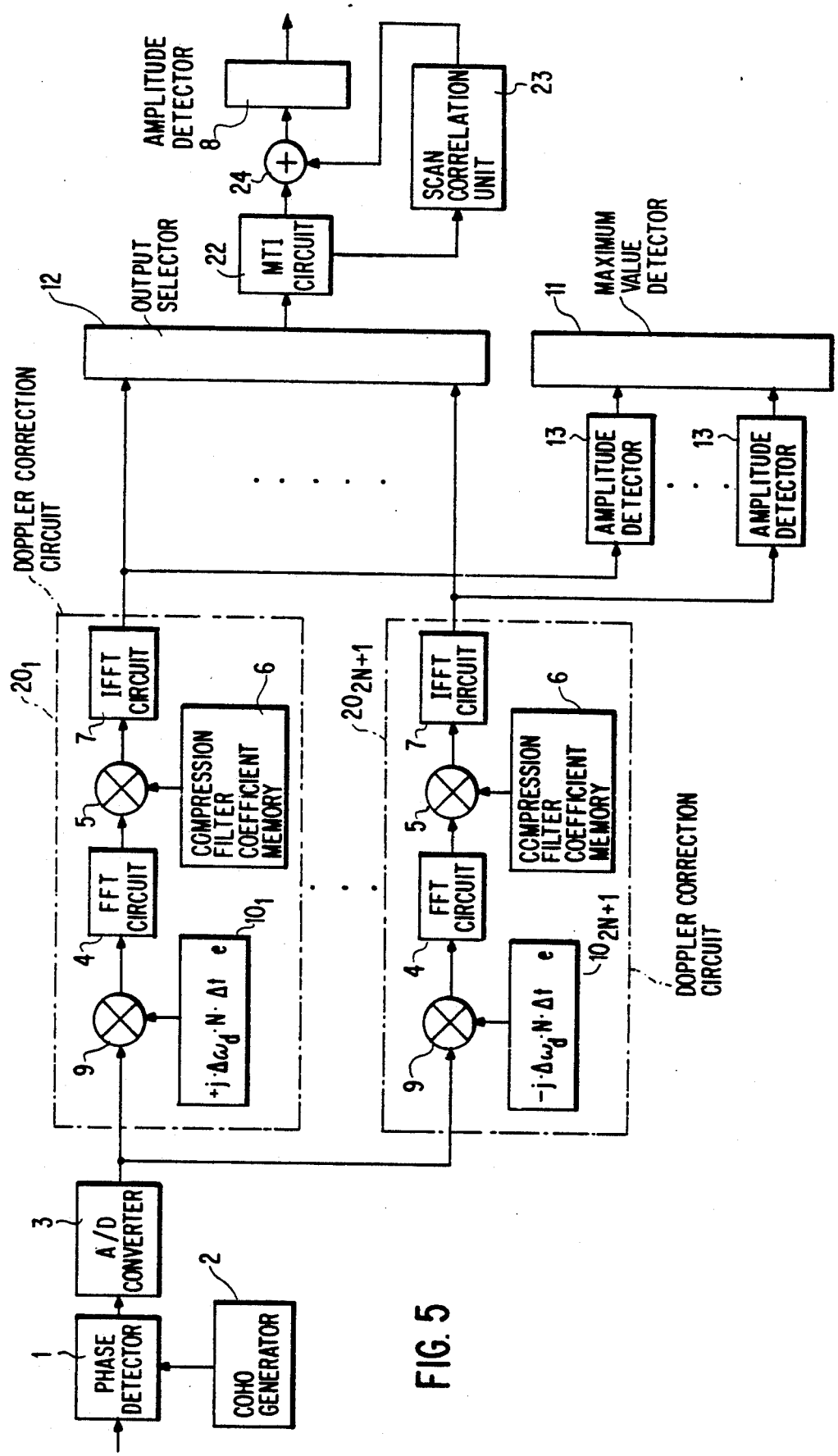
FIG. 5 is a block diagram of a digital pulse compression apparatus of a fifth embodiment of the present invention.
Figure 6:
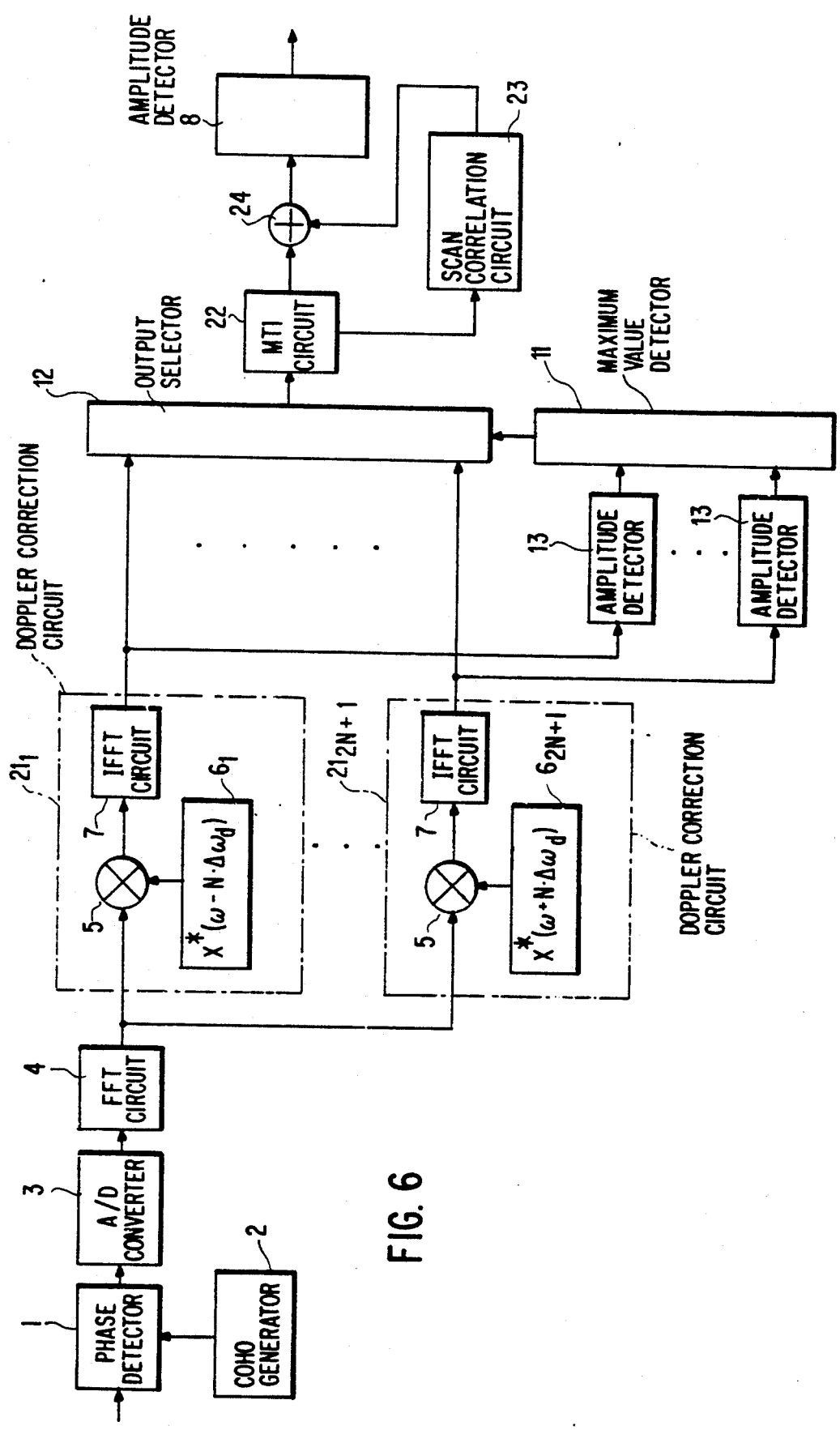
FIG. 6 is a block diagram of a digital pulse compression apparatus of a sixth embodiment of the present invention.
Figure 7:
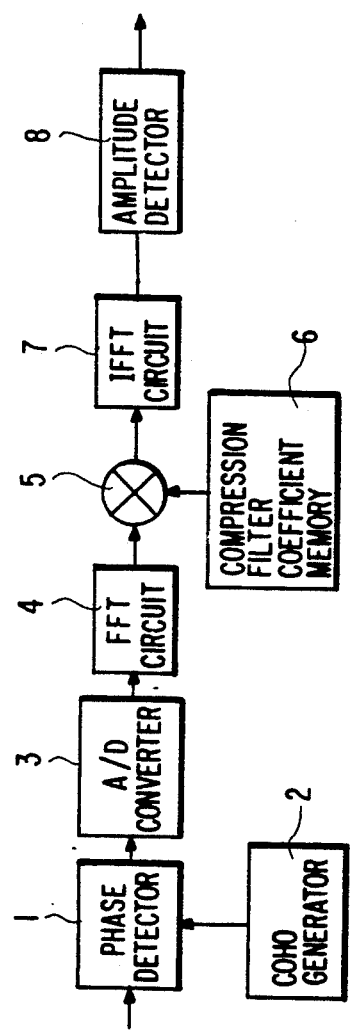
FIG. 7 is a block diagram of a digital pulse compression apparatus of the conventional invention.

FIG. 5 and FIG. 6 are block diagrams of the digital pulse compression apparatus of a fifth and a sixth embodiments of the present invention. The fifth and sixth digital pulse compression apparatus differ from the first and second embodiments of FIG. 1 and FIG. 2 in that the MTI circuit or a pulse doppler circuit, a scan correlation circuit 23 and an adder 24 are arranged at the output port of the selector 12.

Figure 8:
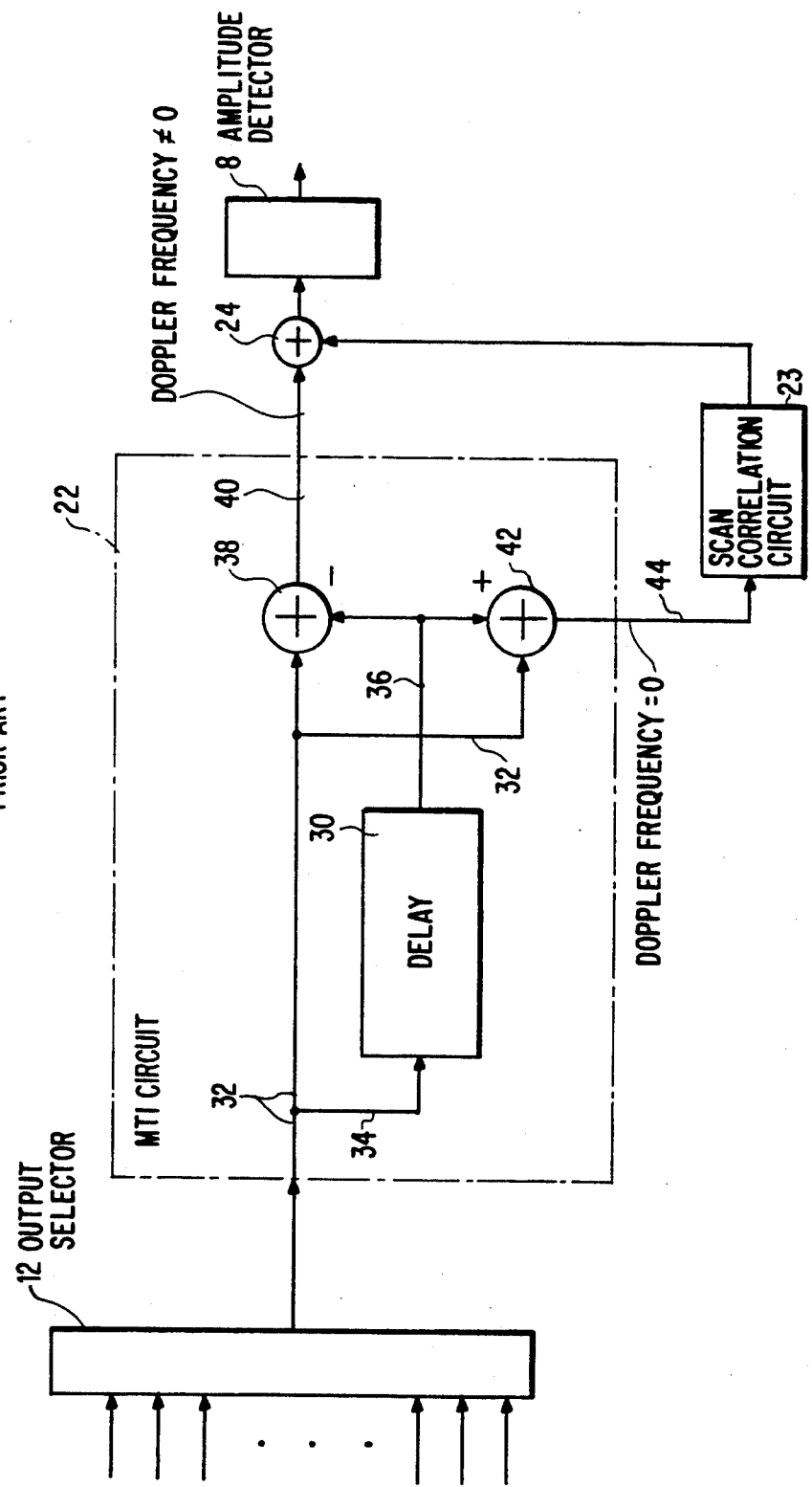
FIG. 8 is a block diagram of a conventional MTI circuit used in FIG. 5 and FIG. 6.

In FIG. 5 and FIG. 6, 22 is a MTI circuit which is arranged at the output port of the selector 12 for eliminating the ground clutter having a large amplitude and 23 is a scan correlation circuit for obtaining an autocorrelation of the output of the MTI circuit 22 corresponding the zero doppler frequency. One example of the MTI 22 is illustrated in FIG. 8. FIG. 8 is an enlarged diagram of a conventional MTI circuit used in FIG. 5 and FIG. 6. Numeral 24 designates an adder for adding the output of the scan correlation circuit 23 to the output of the MTI circuit 22 or the pulse doppler circuit. Other elements of the apparatus are the same as the elements of FIG. 1 and FIG. 2.

With respect to the operation of the MTI circuit 22 of FIG. 8, when the doppler frequency is not zero, the signal can be extracted using a delay circuit 30 to delay the signal 32 on line 34 and output a delayed signal at line 36. The delayed signal at line 36 is subtracted from the original signal 32 by a negative feed through an adder 38 to produce a difference signal 40 between the two signals. When a signal 32 represented, for example, by the i-bit, has subtracted from it the i−1 bit as produced by delay circuit 30, the fixed targets are deleted while moving targets having a non-zero doppler frequency remain.

On the other hand, signals having zero doppler frequency, such as in the case of a moving target having a zero velocity component with respect to the radar direction, (e.g., an airplane flying in a circle around a radar located at the center of the circle), can be extracted using the delay circuit 30, and by summing of the original and delayed signals 32 and 36 through an adder 42 to produce an output signal 44 which is connected to scan correlation circuit 23. In this case, when the original signal 32 (the i-bit) is added to the one period delayed signal (the i−1 bit), a signal having zero doppler frequency can be detected.

The target is correlated using the above zero doppler frequency signal for each scan (each rotation of the antenna) at the current scanning position and the immediately preceding scanning position so that movement of the target can be detected.

In the third and fourth embodiments of the invention shown in FIG. 3 and FIG. 4, there is a problem that the signal of the target disappears, which has substantially the same zero doppler frequency as that of the clutter, for example, the target crossing the radar transversely. But, in the fifth and sixth embodiments of the present invention, the above problem is overcome by carrying out the scan correlation using the signals eliminated by the MTI circuit or the pulse doppler circuit. In the fifth and sixth embodiments of the invention, a moving target having the same zero doppler frequency as that of the clutter can be detected.

What is claimed is:

1. A digital pulse compression apparatus for use in pulse radar, comprising:
   (a) an A/D converter for converting a received video signal to a digital video signal;
   (b) a plurality of doppler correction circuits connected in parallel with each other for carrying out the doppler correction for the digital video signal received from said A/D converter in the time domain, each of said doppler correction circuits having doppler correction amount generators for generating shifted doppler correction amounts which slightly differ from each other in each of said doppler correction circuits respectively, each of said doppler correction circuits further including means for carrying out pulse compression for the corrected signals; and
   (c) a maximum amplitude selecting means for selecting the maximum amplitude signal out of the compressed signals received from said doppler correction circuits at the rate of range bin period.

2. A digital pulse compression apparatus used in the pulse radar, comprising:
   (a) an A/D converter for converting a received video signal to a digital video signal;
   (b) a FFT circuit for converting the digital video signal obtained form the A/D converter to a signal in the frequency domain;
   (c) a plurality of doppler correction circuits connected in parallel with each other for carrying out the doppler correction for the output obtained from said FFT circuit in the frequency domain, each of said doppler correction circuits having compression filter coefficient means for outputting shifted doppler correction amounts which slightly differ from each other in each of said doppler correction circuits respectively, and for carrying out pulse compression for the corrected signals; and
   (d) a maximum amplitude selecting means for selecting the maximum amplitude signal out of the compressed signals received from said doppler correction circuits at the rate of range bin period.

3. The digital pulse compression apparatus of the claim 1 or claim 2, further comprising:
   a MTI circuit at the output port of said A/D converter.

4. The digital pulse compression apparatus of the claim 1 or claim 2, further comprising:
   a pulse doppler circuit at the output port of said A/D converter for attenuating large level clutter.

5. The digital pulse compression apparatus of the claim 1 or claim 2, further comprising:
   a MTI circuit at the output port of maximum amplitude selecting means;
   a scan correlation circuit for obtaining an auto-correlation of the output of said MTI circuit corresponding the zero doppler frequency; and
   an adder for adding the output of said scan correlation circuit to the output of said MTI circuit.

6. The digital pulse compression apparatus of the claim 1 or claim 2, further comprising:
- a pulse doppler circuit at the output port of said maximum amplitude selecting means for attentuating large level clutter;
- a scan correlation circuit for obtaining an auto-correlation of the output of said pulse doppler circuit corresponding the zero doppler frequency; and
- an adder for adding the output of said scan correlation circuit to the output of said pulse doppler circuit.

* * * * *